Patented Jan. 28, 1941

2,229,803

UNITED STATES PATENT OFFICE 2,229,803

P-AMINOBENZYL ACYL AMINES, THEIR QUATERNARY DERIVATIVES, AND THEIR MANUFACTURE

Kurt Engel, St. Louis, France, and Kurt Pfaehler, Basel, Switzerland, assignors to the firm of J. R. Geigy A. G., Basel, Switzerland No Drawing. Application May 24, 1938, Serial No. 209,834. In Switzerland June 3, 1937

9 Claims. (Cl. 260—457)

This invention relates to aminobenzyl acyl amines and aims to produce substances that have not hitherto been described, and to utilize them or certain of their derivatives as wetting, dispersing or emulsifying agents and more especially for softening cotton or precipitated cellulose.

According to the present invention, from the viewpoint of a process of producing the new substances, aminobenzyl aminoaryl compounds are caused to react with non-aromatic carboxylic acid amides, to obtain by a simple and smooth reaction aminobenzyl acyl amines not hitherto described.

This reaction takes place according to the following general diagram:

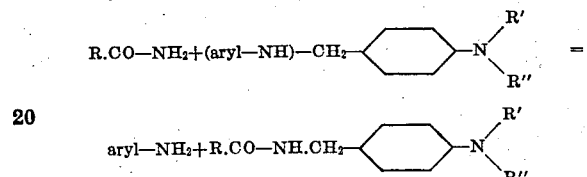

wherein: R.CO—represents the acyl residue of a higher molecular, aliphatic or alicyclic fatty acid, containing more than 5 C-atoms, which may be saturated or unsaturated, substituted or unsubstituted, and R', R" represent alkyl, cycloalkyl or aralkyl radicals, which may be the same or different; one of R' and R" may also be hydrogen.

The aminobenzyl aminoaryl compounds used as initial material are generally produced by the treatment of primary amino compounds, which form only an unstable anhydro-compound with formaldehyde (such as for example p-toluidine, sulphanilic acid, their isomers and homologues, and naphthylamine sulphonic acids), with formaldehyde (or substances reacting in the same manner as this) and secondary and tertiary aromatic amines with a free p-position, which contain the above mentioned N-substituents R' and R".

Such compounds, for example those of sulphanilic acid, formaldehyde and dimethyl-aniline are described in German specification 116,959, according to the process of which these compounds are reacted with aromatic amines with free p-position forming diphenyl-methane derivatives. This leads to a new C—C—bond of the methane carbon atom with a carbon atom of the benzene nucleus of the aromatic amine.

According to the present invention, however, there occurs in a surprising manner a reaction of these aminobenzyl aminoaryl compounds with the N-atom of the non-aromatic carboxylic acid amide resulting in the formation of a new entirely stable C—N—bond. Therewith there has been found an interesting smoothly running new process for the production of p-aminobenzyl amine derivatives.

By treatment according to usual processes with unsubstituted alkylating agents or alkylating agents substituted by halogen and/or hydroxyl groups, the aminobenzyl acyl amines obtained can be converted into quaternary compounds, whereby new and valuable wetting, dispersing and emulsifying agents, and more especially softening agents for cotton or precipitated cellulose, are obtained.

*Example*

1 mol. of stearic acid amide and 1.1 mol. of p-dimethyl-amino-benzyl-sulphanilic acid are heated in an ammoniacal solution for 6 hours in an agitating autoclave to 150° C. After cooling the reaction mass is sucked off and washed with water. Thereupon the product, for the purpose of purification, is placed in hot amyl alcohol, the water is separated and the amyl alcoholic solution is filtered from the undissolved parts. After distilling off the solvent there is obtained the substituted fatty acid amide as a light brown wax-like mass.

By heating for 2 hours with the same quantity by weight of diethyl-sulphate there is obtained the quaternary ammonium compound as a soft mass, which dissolves easily in water and possesses valuable capillary active properties. It is particularly suitable as a softening agent for cotton and precipitated cellulose.

Instead of the p-dimethyl-aminobenzyl-sulphanilic acid used in the above example, it is possible to use the reaction products of other primary amino compounds, which form only an unstable anhydro-compound with formaldehyde, for example metanilic acid, aniline-disulphonic acids, 1:2-toluidine-4-sulphonic acid and p-toluidine, with formaldehyde and aromatic secondary and tertiary amines. Amongst the latter may be mentioned: diethylaniline, ethyl- or methyl-benzyl-aniline, ethyl-o-toluidine, and cyclo-hexylaniline. Instead of the stearic acid amide there may be used the amides of other higher fatty acids and mixtures thereof. There may be mentioned as examples, the amides of oleic acid, palm kernel fatty acid, naphthenic acid, resin acid, campholic acid, fencholic acid, the hydrogenated fish oil fatty acid, and rapeseed oil fatty acid. Instead of diethylsulphate it is possible to use in the above example or modifications thereof: dimethyl-sulphate, butyl-bromide, allyl-bromide, glycol-chlorhydrin, glycerine - α - chlorhydrin, toluolsulpho-amyl-ester and similar alkylating agents.

The compounds obtained thereby possess the same or similar valuable properties as the product according to the example.

What we claim is:

1. Process for the production of p-aminobenzyl acyl amines which consists in causing a carboxylic acid amide of the formula R.CO—NH₂ to react with a p-aminobenzyl aminoaryl compound of the formula

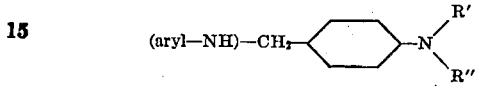

to form p-aminobenzyl acyl amines of the formula

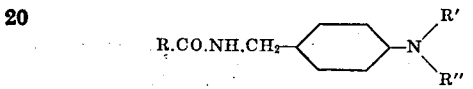

wherein (aryl—NH)—means the radical of a primary amine of the benzene and naphthalene series which forms only an unstable anhydro-compound with formaldehyde, R.CO—represents an acyl residue of a higher molecular saturated or unsaturated fatty acid, selected from the group consisting of aliphatic and alicyclic carboxylic acids, containing more than 5 C-atoms, and R′, R″ represent substituents selected from the group consisting of H, alkyl, cycloalkyl and aralykyl radicals, only one of R′ and R″ being at most identical with H.

2. Process for producing quaternary derivatives of p-aminobenzyl acyl amines consisting in treating the p-aminobenzyl acyl amines according to claim 1 with an alkylating agent selected from the group consisting of unsubstituted alkylating agents and alkylating agents substituted by at least one member of the group consisting of OH and halogen.

3. Process for the production of p-aminobenzyl acyl amines which consists in causing a carboxylic acid amide of the formula R.CO—NH₂ to react with a p-aminobenzyl aminoaryl compound of the formula

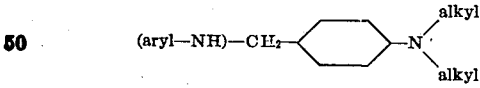

to form p-aminobenzyl acyl amines of the formula

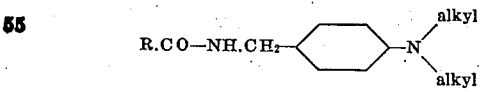

wherein (aryl—NH)— means the radical of a primary amine of the benzene and naphthalene series which forms only an unstable anhydro compound with formaldehyde, and R.CO— represents an acyl residue of a higher molecular saturated or unsaturated fatty acid, selected from the group consisting of aliphatic and alicyclic carboxylic acids, containing more than 5 C-atoms.

4. Process for producing quaternary derivatives of p-aminobenzyl acyl amines consisting in treating the p-aminobenzyl acyl amines according to claim 3 with an alkylating agent selected from the group consisting of unsubstituted alkylating agents and alkylating agents substituted by at least one member of the group consisting of OH and halogen.

5. Process for producing quaternary derivatives of p-dialkylamino-benzyl acyl amines which consists in causing a carboxylic acid amide of the formula R.CO—NH₂ to react with a dialkylaminobenzyl aminobenzene sulphonic acid of the formula

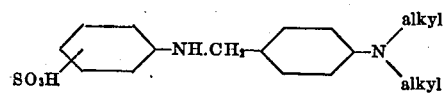

to form a dialkylamino benzyl acyl amine of the formula

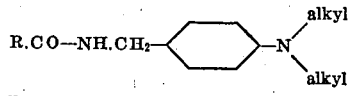

wherein R.CO— represents an acyl residue of a higher molecular fatty acid, selected from the group consisting of saturated and unsaturated aliphatic and alicyclic carboxylic acids, containing more than 5 C-atoms, and treating this compound with an alkylating agent selected from the group consisting of unsubstituted, halogen-, hydroxyl-, and halogen- and hydroxyl-substituted alkylating agents.

6. Process for producing quaternary derivatives of p-alkylaralkylaminobenzyl acyl amines which consists in causing a carboxylic acid amide of the formula R.CO—NH₂ to react with an alkylaralkylaminobenzyl aminobenzene sulphonic acid of the formula

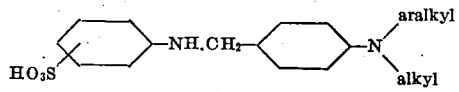

to form an alkylaralkylamino benzyl acyl amine of the formula

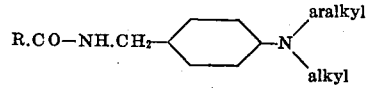

wherein R.CO— represents an acyl residue of a higher molecular fatty acid selected from the group consisting of saturated and unsaturated aliphatic and alicyclic carboxylic acids, containing more than 5 C-atoms and treating this compound with an alkylating agent selected from the group consisting of unsubstituted, halogen-, hydroxyl- and halogen- and hydroxyl-substituted alkylating agents.

7. Process for producing p-trimethyl-amino-benzyl-stearoylamino-methosulphate of the formula:

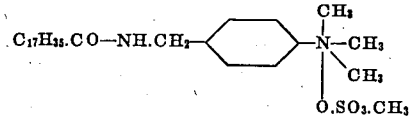

consisting in causing stearic acid amide to react in substantially molecular proportion with p-dimethylamino-benzylsulphanilic acid and alkylating the reaction compound with dimethylsulphate until solubility in water is obtained.

8. Process for producing p-(methylethylbenzylamino)-benzyl - stearoylamino - ethosulphate of the formula:

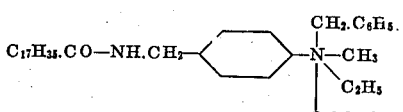

consisting in causing stearic acid amide to react in substantially molecular proportion with p-methyl-benzylamino-benzylsulphanilic acid and alkylating the reaction compound with diethylsulphate until solubility in water is obtained.

9. Process for producing p-(dimethylethylamino)-benzyloleylamino-ethosulphate of the formula:
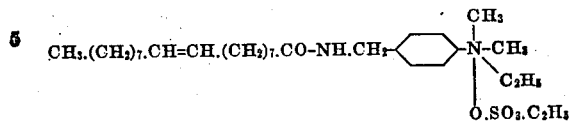
consisting in causing oleic acid amide to react in substantially molecular proportion with p-dimethylamino-benzylsulphanilic acid and alkylating the reaction product with diethylsulphate until solubility in water is obtained.
KURT ENGEL.
KURT PFAEHLER.